May 9, 1967  W. E. ROSE  3,318,150
VOLUME CORRECTING INTEGRATOR FOR FLUID METERS
Filed Oct. 12, 1964
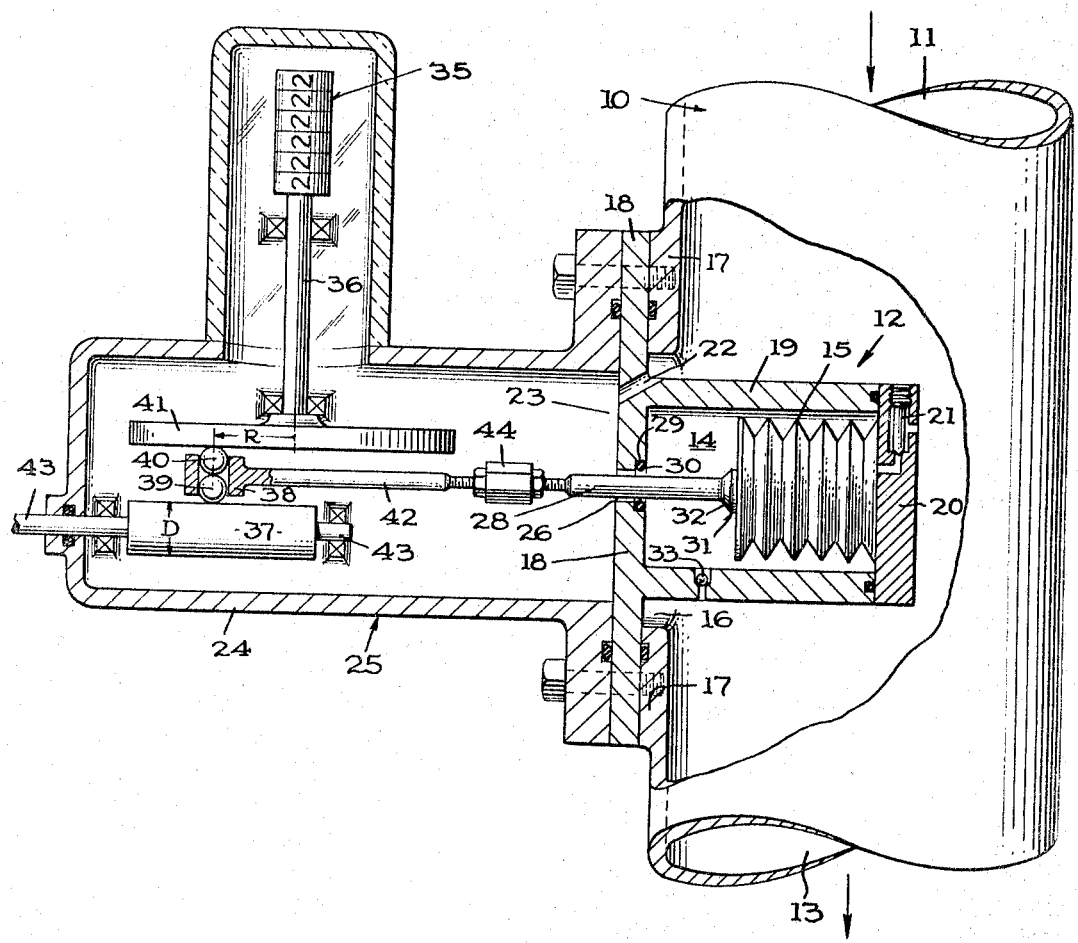
INVENTOR
WILLIS E. ROSE
BY
Cameron, Kerkam & Sutton
ATTORNEYS

United States Patent Office 3,318,150
Patented May 9, 1967

3,318,150
VOLUME CORRECTING INTEGRATOR FOR FLUID METERS
Willis E. Rose, Connersville, Ind., assignor to Dresser Industries, Inc., Dallas, Tex., a corporation of Delaware
Filed Oct. 12, 1964, Ser. No. 403,081
9 Claims. (Cl. 73—233)

This invention relates generally to fluid flow measuring apparatus, and more particularly to a volume correcting integrating mechanism for gas meters.

Fluid meters of the positive displacement type, when used for the measurement of compressible fluids, normally measure the volume of flow of the fluid at the existing line pressure and line temperature; that is, the quantity of fluid passed through the meter is the volumetric displacement at flowing conditions. In many meter installations, variations in the pressure and temperature conditions of the fluid are prevalent. Where such variations exist, some means must be provided for correcting the measured volume in relation to a standard base condition so that the indicator or register will display the corrected volume.

While resort may be had to individual physical measurements and the subsequent employment of manual calculations to compute the corrected volume of fluid flow, this method has generally been recognized as too tedious and time consuming to be practical. Accordingly, various mechanical instruments have been developed which automatically compensate for deviations in pressure and temperature from a standard base condition; however, such instruments have not been entirely satisfactory because of the difficulty encountered in matching the displacement of a fluid sample container to the proper corrective ratio required at all pressures and temperatures. These instruments generally have a limited range of operation and accurately correct only for the deviations which are most frequently experienced. Since the fluid may be subject to widely varying conditions, the inability of these instruments to correct for deviations over the entire range of operating conditions has rendered them unsuitable for use with displacement meters in installations which require a continuous, correct integrated reading over a wide range of pressure and temperature conditions.

In addition, prior devices using a flexible volumetric element, such as a bellows, as a gas sample container are not practical for operation at pressures above 50 p.s.i.g. and as high as 1200 p.s.i.g., because of the excessively large bellows travel which would occur between atmospheric pressure, at which pressure the device must be stored, handled and installed, and the maximum operating pressure desired.

It is the principal object of the present invention to overcome the disadvantages and limitations of the devices of the prior art by providing a volume correcting integrator for fluid meters of novel construction which corrects for all pressure and temperature variations in the metered fluid in a single, continuously integrating mechanism.

Another object is to provide an improved volume correcting integrating mechanism for positive displacement gas meters which utilizes a confined sample of the flowing gas as the corrective basis for the integrator, and which includes means for preventing overtravel of the sample containing element.

These and other objects of the invention will appear more fully from the following detailed description of the mechanical structure and mode of operation of one embodiment thereof. While the specification concludes with claims particularly pointing out and distinctly claiming the subject matter of the present invention, it will be described with reference to the accompanying drawing wherein one specific form of integrating mechanism is illustrated. However, it is to be expressly understood that this drawing is illustrative only, and is not intended to represent the full scope of the invention which is defined by the appended claims.

In accordance with the invention, the improved volume correcting integrator comprises a control element in the form of a sealed flexible container within which is confined a sample of gas of the same composition as the gas flowing through the meter. The flexible container is so located with respect to the flowing gas stream so that its temperature and external pressure are substantially equal to those of said stream. Because the container is quite flexible, its internal pressure is substantially the same as that of the flowing gas. Consequently, the volume of the gas confined in the flexible container will bear the same proportion to a standard volume of gas as does the volume of the flowing gas stream. Furthermore, when the confined sample is identical to the flowing gas, super-compressibility is also compensated for. Since the length of the flexible container is proportional to its internal volume, variations in said length due to volumetric changes produced by the surrounding pressure and temperature conditions are utilized to effect displacement of one of the elements of a variable ratio integrator, and thereby provide a corrective ratio between the input to the integrator which is representative of the uncorrected or actual volumetric flow measured by the meter, and the output thereof which indicates the volumetric flow corrected to a standard base condition.

Referring now to the drawing, the numeral 10 designates a conduit for a fluid stream which may be, for example, part of a gas supply system wherein it is desired to obtain a continuous reading of the volumetric flow of gas passing through the conduit, corrected to a standard base condition. The gas to be metered flows through conduit 10 in the direction of the arrows from the inlet side 11, past a housing 12 which projects radially into the conduit, to the outlet side 13, and then through a meter of the well-known positive displacement type (not shown). The housing 12 provides an environmental chamber 14 for a sealed flexible container 15 in which is confined a predetermined volume of gas, preferably gas of the same composition as that flowing through conduit 10. In order that the environmental chamber 14 may provide the same pressure and temperature conditions as those existing in the gas stream, housing 12 is formed from a good heat-conductive metal and the interior of said housing is normally in communication with the conduit 10, as hereinafter described.

Housing 12 extends into conduit 10 in the path of the gas stream through an opening 16 in the conduit wall which is flanged as at 17 to provide a mounting surface for the base 18 of the housing. Extending from the base 18 is a hollow cylindrical wall member 19 which, together with end plate 20 and the central portion of base 18, forms the environmental chamber 14.

The flexible container 15, which in the preferred embodiment is a Sylphon bellows, has one end securely sealed to the end plate 20 in any suitable manner. The other end of the bellows, which is closed by a transversely extending wall, is free to move axially in response to changes in the volume of the contained gas due to variations in pressure and temperature conditions, and has affixed thereto a connecting rod 28 adapted to be so connected to a variable ratio integrating mechanism, indicated generally at 25, as to introduce a corrective factor which compensates for such variations in pressure and temperature from a standard base condition. End plate 20 has mounted therein a suitable charging valve 21 which allows the interior of the bellows 15 to be charged with a standard gas sample which, as indicated above, is preferably identical to the gas flowing in conduit 10. When the pressure and temperature of the confined gas sample are the same as the standard base pressure and temperature at which it is desired to measure the gas flow, the correction factor of the instrument may be said to be equal to 1.00.

The external pressure on the bellows 15 is maintained equal to the pressure of the gas stream by providing communication between the chamber 14 and the interior of conduit 10. To this end, the base 18 of housing 12 is provided with a vent hole 22 which opens at one end into conduit 10 via the annular portion of opening 16 lying between flange 17 and wall 19, and at the other end into the space 23 behind base 18, which space is part of the gastight interior of the casing 24 in which the integrator 25 is housed. Base 18 is provided with a central opening 26 through which the connecting rod 28 extends for connection to the integrating mechanism. The opening 26 has a diameter greater than that of rod 28 so as to allow free axial movement of the rod, and to also permit the passage of gas from space 23 into the environmental chamber 14 as long as the pressure of the gas in said chamber does not fall below a predetermined minimum.

The bellows 15 is so constructed that its length is proportional to its internal volume. Accordingly, a volume change caused by the environmental pressure and temperature conditions will be reflected in an axial or longitudinal displacement of the free end of the bellows proportional to the change in internal volume, and in a corresponding displacement of rod 28. In order to prevent overexpansion of the bellows when the pressure in chamber 14 falls below the operating range of the device, an automatic seal is provided to limit the surrounding conditions of the bellows to a safe minimum. To this end, passage 26 is enlarged at the side facing chamber 14 so as to provide a shoulder 29 on which is supported a suitable sealing element 30, such as a conventional O-ring. The end of connecting rod 28 fixed to the bellows is provided with a valve member 31 having a tapered surface 32 adapted to seal the opening 26 when seated against sealing element 30. This sealing action occurs when, due to a drop in pressure of the gas below a predetermined minimum, the bellows 15 expands sufficiently to bring the tapered valve surface 32 into engagement with sealing element 30. The device is then insensitive to any further decrease in the pressure existing in the gas stream.

To allow for return of the bellows 15 to its contracted position and reopening of communication between the chamber 14 and conduit 10 via passage 26 and vent hole 22 when the pressure of the gas stream rises to within the operating range, a check valve 33 is conveniently located in wall 19 of the housing 12. The check valve 33 may be of any suitable design operative to open and permit the entry of gas into chamber 14 from conduit 10 when the pressure in the conduit exceeds that of the gas trapped in the chamber when expansion of the bellows closes passage 26.

Axial movements of the rod 28 in response to expansion and contraction of the bellows 15 due to changes in temperature and pressure of the gas stream are transmitted to the integrating device 25 in order to provide a correction factor for the uncorrected volume input measured by the positive displacement meter (not shown) which drives the input shaft 43 of the integrator. The corrected volume output of the integrator is supplied to a conventional totalizer or index 35 which is driven by the integrator output shaft 36.

In the embodiment illustrated, the integrating device 25 is of the well-known cylinder, ball and disc type, comprising an input driving cylinder 37 rotatable about a horizontal axis, a ball cage 38 containing a pair of vertically disposed transfer balls 39 and 40, and an output driven disc 41 which is rotatable about a vertical axis coplanar with the axis of cylinder 37. The ball cage 38 is fixed to the end of a horizontal shaft 42 which is connected to rod 28 and axially displaceable thereby in response to expansion and contraction of the bellows 15. Transfer balls 39 and 40 are in continuous rolling contact with the peripheral surface of cylinder 37 and the under surface of disc 41, respectively, and are also in continuous rolling contact with each other.

The correction factor input shaft 42 and ball cage 38 are movable in a radial direction relative to the disc 41 by rod 28 and bellows 15 in accordance with variations in the instantaneous pressure and temperature of the gas flowing through the conduit 10. The cylinder 37 is driven by shaft 43 at a rate directly proportional to the uncorrected volumetric rate of flow of the gas through conduit 10 as measured by the meter. The cylinder 37 thus drives the disc 41 through transfer balls 39 and 40 at a speed which is determined by both the speed of rotation of cylinder 37 and the radial distance R by which the transfer balls 39, and 40 are displaced from the axis of disc 41. Accordingly, the output shaft 36 of the integrator 25 is rotated at a speed which is directly proportional to the volumetric flow of the gas through conduit 10 corrected to a standard base condition, the displacement R of the transfer balls representing the corrective ratio between the uncorrected volume input applied by shaft 43 to cylinder 37 and the corrected volume output applied by shaft 36 to index 35.

The connection between shaft 42 of the integrator and rod 28 of the bellows corrective mechanism is made through an adjustable link 44 of the turnbuckle type which is internally threaded to receive the threaded ends of shaft 42 and rod 28. Link 44 may be used to calibrate the device by initially adjusting the transfer balls 39, 40 until the radius R is such that the ratio of the integrator is 1:1, i.e., the output shaft 36 and the input shaft 43 rotate at the same speed, when the pressure and temperature of the flowing gas and the sample contained in bellows 15 are equal to the standard base pressure and temperature. When so adjusted R will be equal to $D/2$ where D is the diameter of cylinder 37. Since the bellows 15 is so designed that its length is proportional to its internal volume, subsequent changes in that volume due to variations in the pressure and temperature conditions of the gas will result in changes in the volume and length of the bellows which are a function of said pressure and temperature variations, and which produce axial displacement of the rod 28 and corresponding changes in the displacement R of the transfer balls relative to the axis of disc 41. Any such change in displacement R from that existing under standard conditions varies the ratio between the uncorrected volume input and the corrected volume output of the integrator, and enables the index 35 to register the volume of flow through the conduit 10 corrected to the standard base conditions.

As an example, let it be assumed that the device of the present invention is intended to measure the volumetric flow of gas through the conduit 10 corrected to a standard base pressure of 14.73 p.s.i.a. and a standard base temperature of 60° F., that the area of the movable end wall of bellows 15 is 1 sq. in., and that the gas filling of the bellows is of such composition that the volume of the bellows is 1 cu. in. at the standard base conditions. Under such conditions, the length of the bellows is 1 in. If, then, the diameter of input driving cylinder 37 is 2 in., the displacement R of transfer balls 39, 40 from the axis of disc 41 should be 1 in. in order to provide a 1:1 transmission ratio between the input applied by shaft 43 to cylinder 37 and the output applied by shaft 36 to index 35. If the pressure and temperature conditions of the flowing gas should then change so that the pressure is 29.73 p.s.i.a. and the temperature is 40° F., the volume of bellows 15 will become $$1.0 \times \frac{14.73}{29.73} \times \frac{500}{520} = 0.476 \text{ cu. in.}$$

and the length of the bellows will decrease to 0.476 in. Since this reduction in length of the bellows is transmitted to ball cage 38 and transfer balls 39, 40, the displacement R of the latter is reduced to 0.476 in., which in turn changes the transmission ratio of the intergrating mechanism, represented by the expression $D/2:R$, to $1:0.476$, or $2.1:1$. Since the ratio between the standard base conditions and those assumed above is $$\frac{29.73}{14.73} \times \frac{520}{500} = 2.1:1$$

it will be seen that the proper ratio correction is made by the mechanism disclosed.

While the device of the present invention is particularly adapted for operation at pressures in the range of from about 50 p.s.i.g. up to about 1200 p.s.i.g., it will be readily appreciated that the instrument can be calibrated so as to operate between any desired limits. Such calibration can be effected by selecting a bellows of particular expansion characteristics, by adjusting the connection between the bellows and the integrator, by controlling the amount of charging gas within the bellows, or by compensation of the gas filling of the bellows by a suitable inert material, such as a liquid.

There is thus provided by the present invention a mechanically simple, yet accurate and reliable, volume correcting integrating mechanism for fluid meters. While the disclosed device is particularly well adapted for use in metering gas, it is also useful for correcting the measurement of flowing liquids to a standard base condition when the volumetric measurement is made at temperatures or pressures which deviate from the base conditions. However, when a liquid is involved, it is not essential that provision be made for preventing overtravel or overexpansion of the bellows because the volumetric changes in liquids due to normal pressure and temperature variations are of a low order and can be readily absorbed in the normal bellows travel.

Although only one specific embodiment of the invention has been described and illustrated in the accompanying drawing, it will be obvious to those skilled in the art that various changes may be made in the mechanical details of the device without departing from the inventive concept. It is therefore intended by the appended claims to cover all such modifications which fall within the true spirit and scope of the invention.

What is claimed is:

1. A volume correcting integrator for fluid meters comprising a variable ratio integrating mechanism having an input directly proportional to the volumetric flow of the flowing fluid being metered at the existing pressure and temperature thereof and an output indicative of said volumetric flow corrected to a standard base pressure and temperature, a sealed flexible container for confining a sample of fluid of the same composition as the flowing fluid, said flexible container being fixedly supported at one end and having its other end free to move in response to variations in the volume of the contained fluid due to variations in the pressure and temperature thereof, means forming an environmental chamber in which said flexible container is supported, means defining an opening in said chamber for normally admitting some of the flowing fluid to the interior of said chamber so as to subject said flexible container to a temperature and an external pressure substantially equal to those of the flowing fluid, means connected to the free end of said flexible container for varying the ratio between the input and the output of said integrating mechanism, and means connected to the free end of said flexible container for closing said chamber opening to prevent access of the flowing fluid to said chamber when the pressure in said chamber falls below a predetermined range.

2. A volume correcting integrator as defined in claim 1 wherein said flexible container comprises a bellows the free end of which is movable rectilinearly in one direction, wherein said means connected to the free end of said flexible container for varying the ratio of said integrating mechanism includes a rod connected to the free end of said bellows and extending in the direction of movement of said bellows, wherein said rod extends through the opening in said environmental chamber, wherein said chamber opening defines a valve seat, and wherein said means for closing said chamber opening comprises a valve closure member fixed to said rod for engaging said valve seat.

3. Apparatus for measuring the flow of gas through a conduit comprising a sealed expansible-contractible element for containing a sample of gas of the same composition as the gas flowing through the conduit, a housing forming a chamber in which said element is mounted, one end of said element being movable in response to variations in the volume of the contained gas, means including a passage formed in a portion of said housing normally providing communication between the interior of said conduit and the interior of said housing so as to expose said element to the temperature and pressure of the flowing gas stream, a variable ratio integrating mechanism having an input directly proportional to the volumetric flow of the gas through said conduit at the pressure and temperature existing therein and an output indicative of said volumetric flow corrected to a standard base pressure and temperature, means actuated by the movements of the free end of said element for varying the ratio between the input and output of said integrating mechanism, and means for preventing further movement of the free end of said element when the pressure of the flowing gas stream drops below a predetermined range, said last named means including a member carried by the movable end of said element for closing said passage when said element has expanded to a predetermined extent.

4. Gas flow measuring apparatus as defined in claim 3 including normally closed valve means operable to admit the flowing gas to said chamber when the pressure of said gas exceeds that within said chamber.

5. Apparatus for measuring the flow of gas through a conduit comprising a gastight housing projecting into the conduit in the path of the flowing gas stream, said housing having a base adapted to be connected to the conduit, a side wall and an end wall, an expansible-contractible bellows having one end fixed to the end wall of said housing and the other end free for movement along the axis of said bellows, said bellows containing a quantity of gas of the same composition as the gas flowing through the conduit, the free end of said bellows being movable in response to variations in the volume of the contained gas, means including an opening in the base of said housing normally providing communication between the interior of said conduit and the interior of said housing, whereby the bellows may be subjected to the pressure and temperature of the flowing gas, a gastight casing connected to the base of said housing, said opening in said base communicating the interiors of said housing and of said casing, a variable ratio integrating mechanism mounted in said casing having an input element driven at a rate directly proportional to the volumetric flow of gas through the conduit and an output element adapted to provide an indication of said volumetric flow corrected to a standard base pressure and temperature, means for varying the transmission ratio between the input and the output elements of said integrating mechanism, a member connected to the free end of said bellows extending through said opening in the base of said housing and connected to said ratio varying means, and means carried by said member for closing said opening when the pressure of the flowing gas drops below a predetermined range.

6. Gas flow measuring apparatus as defined in claim 5 including a normally closed valve in one wall of said housing operable to admit gas from the interior of said conduit to the interior of said housing when the pressure of the flowing gas in the conduit exceeds the pressure within said housing when said opening is closed.

7. Gas flow measuring apparatus as defined in claim 5 wherein said integrating mechanism includes a cylindrical input element rotatable about a horizontal axis and an output element in the form of a disc rotatable about a vertical axis coplanar with the axis of said input cylinder, and wherein said transmission ratio varying means includes a pair of vertically disposed transfer balls in rolling contact with one another, one of said balls also being in rolling contact with said cylinder while the other is in rolling contact with said disc, and a cage member containing said transfer balls, said member connected to the free end of said bellows being connected to said cage member, whereby movement of said member varies the radial distance of said cage member from the axis of said disc.

8. Apparatus for measuring the flow of gas through a conduit comprising a sealed expansible-contractible element containing a quantity of gas of the same composition as the gas flowing through the conduit, means for supporting said element in such a location relative to the flowing gas that its temperature and external pressure are substantially equal to those of the flowing gas, one end of said element being movable in response to variations in the volume of the contained gas due to variations in the pressure and temperature of the flowing gas, a variable ratio integrating mechanism having an input shaft driven at a rate directly proportional to the volumetric flow of gas through the conduit at the pressure and temperature existing therein and an output shaft drivably connected to an indicator for registering said volumetric flow corrected to a standard base pressure and temperature, said integrating mechanism including a cylindrical element rotatably driven by said input shaft, a disc rotatable about an axis perpendicular to the axis of said cylinder and drivably connected to said output shaft, wheel means in rolling contact with said cylinder and the face of said disc for transmitting the motion of said cylinder to said disc at a variable transmission ratio, said wheel means being movable axially with respect to said cylinder and radially with respect to said disc, and means connected to the movable end of said element for varying the position of said wheel means and thereby matching the ratio between the input and the output of said integrating mechanism to the movement of the expansible-contractible element.

9. A volume correcting integrator for fluid meters comprising a variable ratio integrating mechanism having an input directly proportional to the volumetric flow of tthe flowing fluid being metered at the existing pressure and temperature thereof and an output indicative of said volumetric flow corrected to a standard base pressure and temperature, a sealed flexible container within which is confined a sample of fluid of the same composition as the flowing fluid, said flexible container being fixedly supported at one end and having its other end free to move in response to variations in the volume of the contained fluid due to variations in the pressure and temperature thereof, means forming an environmental chamber in which said flexible container is supported, means for normally admitting some of the flowing fluid to the interior of said chamber so as to subject said flexible container to a temperature and an external pressure substantially equal to those of the flowing fluid, means connected to the free end of said flexible container for varying the ratio between the input and the output of said integrating mechanism, means for preventing access of the flowing fluid to said chamber when the pressure in said chamber falls below a predetermined range, and normally closed valve means operable to admit the flowing fluid to said chamber when the pressure of said fluid exceeds that within said chamber.

References Cited by the Examiner
UNITED STATES PATENTS

| | | | |
|---|---|---|---|
| 2,072,617 | 3/1937 | Cate | 92—43 |
| 2,438,934 | 4/1948 | Marsh | 73—233 |
| 2,715,339 | 8/1955 | Honig | 73—392 X |
| 2,791,118 | 5/1957 | Holtz | 73—233 |
| 3,012,436 | 12/1961 | Meyers | 73—322 X |
| 3,053,082 | 9/1962 | Loud et al. | 73—233 X |
| 3,158,029 | 11/1964 | Fischer | 73—407 |

FOREIGN PATENTS 746,800　12/1944　Germany.

RICHARD C. QUEISSER, *Primary Examiner.*

E. D. GILHOOLY, *Assistant Examiner.*